United States Patent
Krohn

(10) Patent No.: US 11,933,121 B2
(45) Date of Patent: Mar. 19, 2024

(54) METHOD AND APPARATUS FOR SEPARATING DRILL CUTTINGS FROM DRILL MUD

(71) Applicant: Solidsvac Pty Ltd ACN 664060137, Caboolture (AU)

(72) Inventor: Mark Krohn, Woorim (AU)

(73) Assignee: Solidsvac Pty Ltd ACN 664060137, Caboolture (AU)

( * ) Notice: Subject to any disclaimer, the term of this patent is extended or adjusted under 35 U.S.C. 154(b) by 781 days.

(21) Appl. No.: 16/970,681

(22) PCT Filed: Feb. 18, 2019

(86) PCT No.: PCT/AU2019/050133
§ 371 (c)(1),
(2) Date: Aug. 18, 2020

(87) PCT Pub. No.: WO2019/157570
PCT Pub. Date: Aug. 22, 2019

(65) Prior Publication Data
US 2020/0378200 A1    Dec. 3, 2020

(30) Foreign Application Priority Data
Feb. 18, 2018    (AU) ................. 2018900547

(51) Int. Cl.
*E21B 21/06*    (2006.01)
*B07B 1/46*    (2006.01)
(Continued)

(52) U.S. Cl.
CPC .......... *E21B 21/066* (2013.01); *E21B 41/005* (2013.01); *B01D 2221/04* (2013.01); *B07B 1/46* (2013.01); *B07B 13/16* (2013.01)

(58) Field of Classification Search
CPC . E21B 21/066; E21B 41/005; B01D 2221/04; B07B 1/46; B07B 13/16
See application file for complete search history.

(56) References Cited

U.S. PATENT DOCUMENTS

| 2,266,586 A | 12/1941 | Branum |
| 3,662,897 A | 5/1972 | Huff |

(Continued)

FOREIGN PATENT DOCUMENTS

| EP | 0063910 A2 * | 3/1982 | ............... B03B 9/02 |
| EP | 0063910 A2 | 11/1982 | |

OTHER PUBLICATIONS

International Search Report and Written Opinion issued in corresponding application No. PCT/AU/2019/050133, dated Apr. 10, 2019, 8 pages.

(Continued)

*Primary Examiner* — Crystal J. Lee
(74) *Attorney, Agent, or Firm* — Meunier Carlin & Curfman LLC

(57) ABSTRACT

An apparatus for separating particles, such as drill cuttings, from a flowable substance, such as drilling mud, is provided. The apparatus comprises an inlet for entry of particles combined with the flowable substance; an outlet for exit of particles separated from the flowable substance; a movable screen located between the inlet and the outlet; and a wash unit for delivering a wash agent to the particles. The screen allows for passage of the flowable substance therethrough, and defines a path for passage of the particles between the inlet and the outlet. Delivery of the wash agent to the particles assists with separation of the particles from the flowable substance. Associated systems and methods are also provided.

19 Claims, 9 Drawing Sheets

(51) Int. Cl.
    *B07B 13/16*         (2006.01)
    *E21B 41/00*         (2006.01)

(56) References Cited

U.S. PATENT DOCUMENTS 6,279,471 B1     8/2001   Reddoch
2003/0221331 A1*  12/2003  Reddoch .................. F26B 5/08
                                          34/236

OTHER PUBLICATIONS

International Preliminary Report on Patentability issued in corresponding application No. PCT/AU/2019/050133, dated Jun. 5, 2020, 24 pages.
Extended European Search Report received in connection with European Application No. 19753725.1, dated Oct. 18, 2021, 10 pages.
Decision to Grant received in connection with European Application No. 19753725.1, dated Sep. 11, 2023, 2 pages.

* cited by examiner

METHOD AND APPARATUS FOR SEPARATING DRILL CUTTINGS FROM DRILL MUD

This invention relates to an apparatus, system, and method suitable for separating drill cuttings from drilling mud, although without limitation thereto.

This invention has particular application to separation of drill cuttings from drilling mud on offshore rigs. This invention also has particular application to processing of legacy material, such as separating chips for disposal and oil-based drilling muds for recycling, in environmental protection as well as material salvaging contexts. For illustrative purposes reference is made herein to such applications. However, it is to be understood that this invention could be used in other applications, including separation of suitable particulates from suitable flowable substances generally.

BACKGROUND

Terrestrial processing systems for the processing of drill cuttings contaminated with drilling mud are generally very large, and unsuitable (or at least undesirable) for use on offshore rigs. Bulk storage and transport of contaminated cuttings may be possible. In some cases, spent muds and chips are accumulated on offshore rigs, with ship to shore transport of the waste ultimately occurring for processing. Alternatively, some preliminary processing, e.g. by centrifugation and/or drying, can be performed, followed by transfer of semi-processed material. However, due to costs of transporting and processing, where jurisdictional laws permit, cuttings waste generated on rigs is typically dumped overboard, which may have serious environmental implications.

Several options for more effective processing of cuttings waste are being explored. Technology such as cuttings re-injection (CRI) and Thermal Desorption Units (TDU) are known, but such technology is typically expensive and difficult to apply on a large scale. Microwave-based processing has also been explored, but has limited scalability, with current technology only capable of processing about five tonnes of material per hour.

The use of vibrating banana screens having a partial vacuum applied to draw mud through the screen has been contemplated. However, only a small area of cuttings is exposed to the cutting in such designs, limiting efficiency for mud removal and processing throughput.

Cuttings dryers such as VERTI-G products, and the like, can typically reduce mud content down to about 5% oil on cuttings (OOC). However, as the drilling process results in a large variance in material to be processed, such equipment tends to struggle with blockages, such as screen 'binding-up', and other throughput-related process issues.

SUMMARY

The present invention broadly provides an apparatus for separating particles from a substance or agent, typically a flowable or semi-flowable substance or agent. A method of separating particles from a substance or agent, typically a flowable or semi-flowable substance or agent, is also broadly provided.

In a first aspect, the invention provides an apparatus for separating particles from a flowable substance, the apparatus comprising:

an inlet for entry of particles combined with the flowable substance;

an outlet for exit of particles separated from the flowable substance;

a movable screen located between the inlet and the outlet; and a wash unit for delivering a wash agent to the particles, wherein:

the screen allows for passage of the flowable substance therethrough, and defines a path for passage of the particles between the inlet and the outlet; and delivery of the wash agent to the particles assists with separation of the particles from the flowable substance.

Suitably, the apparatus of the first aspect is adapted to separate particles in the form of drill cuttings from the flowable substance. Suitably, the apparatus is adapted to separate particles, such as drill cuttings, from a flowable substance in the form of drilling fluid or drilling mud, such as oil-based mud.

The screen of the apparatus suitably comprises an inner surface and an outer surface. Suitably, the screen allows for passage of the flowable substance from the inner surface thereof past the outer surface thereof. Suitably, the screen allows for passage of the particles along the inner surface thereof, between the inlet and the outlet.

Suitably, the screen of the apparatus comprises apertures adapted for passage of the flowable substance therethrough. Suitably, the apertures are sized to constrain or prevent particles for separation from the flowable substance from passage therethrough.

In embodiments, the apertures of the screen are substantially evenly spaced throughout the screen. In embodiments, the apertures are between about 1 mm and about 5 mm in diameter, such as about 2 mm in diameter. In embodiments, the apertures occupy between about 25% and about 75% of a surface area of the screen, such as about 50% of the surface area of the screen.

Suitably, movement of the screen of the apparatus assists with separation of the particles from the flowable substance. Suitably, movement of the screen assists with passage of the flowable substance therethrough.

Suitably, the screen is elongated between the inlet and the outlet, in a longitudinal direction. In embodiments, the screen is substantially horizontal in the longitudinal direction.

In embodiments, the movable screen of the apparatus of the first aspect is a turnable screen. In embodiments, the movable screen is a rotatable screen. Suitably, movement, such as rotation, of the screen is powered. In embodiments, movement, such as rotation, is powered by a motor. In embodiments, the motor is an electric motor. In embodiments, movement, such as rotation, of the screen is controlled by a variable frequency drive, or the like.

In embodiments, the screen of the apparatus is enclosed except at an open inlet end and an open outlet end. In embodiments, the inlet and outlet of the apparatus are in the form of, or comprise, an open inlet end and open outlet end, respectively, of the enclosed screen.

In embodiments, the screen of the apparatus is substantially cylindrical. In embodiments, the inlet and outlet of the apparatus are in the form of, or comprise, an open inlet end and open outlet end, respectively, of the cylindrical screen.

The screen may comprise a longitudinally extending wash screen portion. The screen may further comprise a longitudinally extending vacuum screen portion, which may be located at or towards the inlet; and/or a longitudinally extending blower screen portion, which may be located at or towards the outlet.

In embodiments, the screen comprises a longitudinally extending wash screen portion located between a longitudinally extending vacuum screen portion and a longitudinally extending screen blower portion. In embodiments, the ratio of the length of the wash screen portion to the length of the vacuum screen portion is between about 7 to 1 to about 15 to 1, such as about 8.5 to 1. In embodiments, the ratio of the length of the wash screen portion to the blower screen portion is between about 3 to 1 to about 8 to 1, such as about 5.5 to 1.

In embodiments, the screen is located within a housing of the apparatus.

In embodiments, the apparatus comprises a plurality of screens. In an embodiment, the apparatus comprises two screens. The two screens may be oriented, such as side-by-side, within a shared housing of the apparatus.

In embodiments, the wash unit of the apparatus is adapted to deliver a wash agent in the form of an aqueous surfactant solution to the particles. Suitably, the wash unit is adapted to deliver the wash agent towards the inner surface of the screen.

Suitably, the wash unit comprises, or is connectable with, a supply of the wash agent, such as the aqueous surfactant. In embodiments, the wash unit comprises, or is connectable with, a supply container or supply tank in which the wash agent is stored.

In embodiments, the wash unit of the apparatus is adapted to supply the wash agent to the particles after passage of at least a portion of the flowable substance through the screen.

In embodiments, the wash unit is adapted to supply the wash agent to the particles at a position within the screen away from the inlet.

In embodiments, the wash unit is adapted to supply the wash agent to the particles within the screen at a position away from the outlet.

In embodiments wherein the screen comprises a wash portion, the wash unit will suitably be adapted to deliver the wash agent to the particles within the wash potion of the screen.

In embodiments, the wash unit is adapted to supply the wash agent to the particles at a plurality of spaced positions within the screen, at increasing distances from the inlet and decreasing distances from the outlet. In embodiments, the plurality of spaced positions is at least five spaced positions or at least ten spaced positions, such as eleven spaced positions.

In embodiments, the wash unit is adapted to supply the wash agent within the screen at a position including a lowest portion of the screen.

In embodiments, the wash unit comprises a wash unit actuator for adjusting the position within the screen at which the wash agent is supplied. In embodiments, such as embodiments wherein the screen is a cylindrical screen, the wash unit actuator may facilitate axially adjusting the position at which the wash agent is supplied relative to the inner surface of the screen.

Suitably, the wash unit is adapted to supply the wash agent to the particles under pressure. In embodiments, the wash unit is adapted to adjust the pressure at which the wash agent is supplied. In embodiments, the wash unit comprises a spray opening, or a plurality of spray openings, for spraying the wash agent on the particles under pressure. Suitably, supply of the wash agent to the particles under pressure by the wash unit assists with separation of the particles from the flowable substance.

In embodiments, the wash unit comprises a spray pipe or spray manifold comprising a plurality of spray openings adapted to supply the wash agent at each of the one or more positions away from the inlet of the screen. In embodiments, the plurality of spray openings of each of the one or more manifolds are adapted to supply the wash agent to the particle by a fan-like spray.

In embodiments, the apparatus of the first aspect comprises a conveyer adapted to move the particles towards the outlet. Suitably, the conveyer is positioned adjacent to the inner surface of the screen.

In embodiments wherein the screen is an enclosed screen, suitably, the conveyer is located within the screen.

In embodiments, the conveyer is in fixed, or substantially fixed, connection with the screen.

In embodiments, the conveyer of the apparatus is a screw conveyer. In embodiments, the conveyer is a shaft-less screw conveyer.

In embodiments, rotation of the screw conveyer of the apparatus moves the particles towards the outlet. In embodiments, concurrent rotation of the screen and the screw conveyer, in fixed or substantially fixed connection, moves the particles towards the outlet of the apparatus.

In embodiments, the apparatus comprises, or is connectable with, a flowable substance receptacle, for receiving at least a portion of the flowable substance through the screen.

Suitably, the flowable substance receptacle is adapted to receive a portion of the flowable substance that does not contain, or does not substantially contain, wash agent added to the particles by the wash unit.

In embodiments, the flowable substance receptacle is adapted to receive a portion of the flowable substance that has passed through the screen at a position towards the inlet of the apparatus, prior to addition of the wash agent to the particles.

In embodiments, the flowable substance receptacle comprises, or is connectable with, a pump for transferring the flowable substance received through the screen. In embodiments, the pump is a vacuum pump.

In embodiments, the apparatus comprises, or is connectable with, a vacuum unit for obtaining at least a portion of the flowable substance through the screen under vacuum.

In embodiments wherein the apparatus comprises a flowable substance receptacle, the vacuum unit may be adapted to deliver the flowable substance obtained through the screen to the flowable substance receptacle.

In embodiments, the vacuum unit comprises a vacuum unit housing.

In embodiments wherein the screen is located within a housing of the apparatus, suitably, the vacuum unit housing is of, or connected with, the housing of the apparatus.

In embodiments wherein the apparatus comprises a flowable substance receptacle and a vacuum unit housing, the vacuum unit housing may comprise, or be connectable to, the flowable substance receptacle.

Suitably, the vacuum unit is adapted to obtain a portion of the flowable substance that does not contain, or does not substantially contain, wash agent delivered by the wash unit.

In embodiments, the vacuum unit is adapted to obtain a portion of the flowable substance through the screen at a position towards the inlet of the apparatus, prior to addition of the wash agent to the particles.

Suitably, the vacuum unit comprises a suction head for connection with the screen. In embodiments, the suction head is adapted for sprung connection with the screen. In embodiments, the suction head comprises a suction pad in sprung connection with the screen.

In embodiments, the suction head is for connection with the screen at a position towards the inlet end of the apparatus.

In embodiments, the suction head is for connection with the screen at a position including a lowest point of the screen.

In embodiments wherein the screen is a rotatable screen, the suction head may be for connection with the screen at a position offset about the lowest point of the screen, in the direction of screen rotation.

In embodiments, the suction head is for connection with between about 20% and about 60% of a diameter of the screen, such as about 40% of the diameter of the screen.

In embodiments, the suction head is for connection with between about 5% and about 15% of the length of the screen, such as about 10% of the length of the screen.

Suitably, in embodiments wherein the apparatus comprises a vacuum unit, the screen of the apparatus comprises a vacuum screen portion, and the vacuum unit is adapted to obtain the flowable substance through the vacuum screen portion of the screen.

In embodiments, the vacuum unit is adapted to transfer the flowable substance obtained through the screen under vacuum. Suitably, the vacuum unit may comprise a vacuum pump for transfer of the flowable substance obtained through the screen under vacuum.

In embodiments wherein the apparatus comprises a flowable substance receptacle connectable to a pump for transferring the flowable substance away from the receptacle, the pump may be a vacuum pump of the vacuum unit.

In embodiments, the apparatus of the first aspect comprises, or is connectable with, a catch container or catch tank, for receiving at least a portion of the flowable substance through the screen.

Suitably, the catch tank is adapted to receive a mixture containing the flowable substance, the wash agent delivered by the wash unit, and particulate fines.

In embodiments, the catch tank is shaped to direct the mixture containing the flowable substance, the wash agent delivered by the wash unit, and particulate fines towards a floor of the tank.

In embodiments, the catch tank comprises an inclined wall adapted to direct the flowable substance, the wash agent, and/or the particulate fines received through the screen, towards the floor of the tank. In embodiments the incline of the inclined wall is greater than 40%, such as at least 60%. In embodiments, the incline of the inclined wall is at least 65%.

In embodiments, a pump is positioned, or positionable, at the floor of the catch tank. In embodiments, the pump is an impeller pump. In embodiments, the pump is an open impeller pump. In embodiments, the pump is a vortex impeller pump.

In embodiments, the apparatus of the first aspect comprises a blower unit for facilitating transfer of residual flowable substance, wash agent, and/or particulate fines, through the screen into the catch tank, by gas flow, such as air flow.

Suitably, the blower unit is adapted to blow gas, such as air, onto residual flowable substance, wash agent, and/or particulate fines, thereby blowing the residual flowable substance, wash agent, and/or particulate fines through the screen into the catch tank.

In embodiments, the blower unit is adapted to blow gas, such as air, onto residual flowable substance, wash agent, and/or particulate fines, at a position towards the outlet of the apparatus. Suitably, in embodiments wherein the apparatus comprises a blower unit, the screen of the apparatus comprises a blower screen portion, and the blower unit is adapted to blow gas, such as air, within the blower portion of the screen.

In embodiments, the blower unit comprises a blower outlet located within the screen. Suitably, the blower outlet is located within the blower screen portion of the screen. In embodiments, the blower outlet of the blower unit is an air blade or air knife, or the like.

In embodiments, the blower unit comprises a blower unit actuator for adjusting the position within the screen at which gas or air is blown by the blower unit.

In embodiments, the blower unit actuator is the wash unit actuator of the wash unit of the apparatus. Suitably, in embodiments wherein the blower unit actuator is the wash unit actuator, the blower unit may comprise a blower outlet connected with a spray pipe of the wash unit.

In embodiments, the apparatus of the first aspect comprises an inlet control for delivery of the particles combined with the flowable substance, through the inlet.

In embodiments, the inlet control comprises an inlet control housing. In embodiments, the inlet control housing is connected, or connectable, with the housing of the apparatus.

In embodiments, the inlet control comprises an inlet control screw conveyer, or inlet control auger.

The inlet control of the apparatus may be adapted to adjust the rate of entry of the particles combined with the flowable substance through the inlet of the apparatus. In embodiments, the rate of entry of the particles is controlled using a variable frequency drive, or the like.

The inlet control may be adapted to direct the particles combined with the flowable substance into each of a plurality of screens of the apparatus. In embodiments, the inlet control comprises a plurality of inlet control screw conveyers, adapted to direct the particles combined with the flowable substance into respective screens of the apparatus. In an embodiment, the inlet control comprises two inlet control screw conveyers, each adapted to direct the particles combined with the flowable substance into one of two screens of the apparatus.

A second aspect of the invention provides a system for separating particles from a flowable substance, the system comprising an apparatus of the first aspect, and at least one of:

a pre-treatment unit for processing the particles combined with the flowable substance, or a precursor thereof, prior to entry through the inlet of the apparatus;

a supply unit for supplying wash agent to the wash unit of the apparatus; and a centrifuge unit for separating phases of a solution or mixture comprising at least a portion of the flowable substance that has passed through the screen of the apparatus.

In embodiments of the second aspect, the pre-treatment unit comprises a shaker unit, such as a shale shaker unit. The shaker unit may comprise one or more of a shaker; sand trap; degasser; desander; desilter; and centrifuge. In embodiments, the pre-treatment unit comprises a trommel and/or auger arrangement.

Suitably, the pre-treatment unit is adapted to pre-process the particles combined with the flowable substance, or a precursor thereto, prior to transfer to the apparatus of the first aspect.

Suitably, the supply unit of the system of the second aspect comprises a supply container or supply tank. In embodiments, the supply unit further comprises, or is connectable with, a solvent container or tank; and/or an additive container or tank.

The supply tank of the supply unit will suitably be adapted for storage of the wash agent, and transfer of the wash agent to the wash unit of the apparatus. In embodiments, the supply tank comprises, or is connectable with, a supply pump for transfer of the wash agent to the wash unit. Suitably, the supply tank of the supply unit will be the supply tank of, or connectable to, the apparatus of the first aspect.

The solvent tank of the supply unit will suitably be adapted to store a solvent component of the wash agent, and to transfer the solvent component to the supply tank, before or after mixing with an additive. In an embodiment, the solvent component is water, and the solvent tank is a water tank. In embodiments, the solvent tank comprises, or is connectable with, a solvent pump for transfer of the solvent to the supply tank, before or after mixing with an additive.

The additive tank of the supply unit will suitably be adapted to store an additive component of the wash agent, and to transfer the additive component to the supply tank, before or after mixing with a solvent. In an embodiment, the additive component is a surfactant, and the additive tank is a surfactant tank. In embodiments, the additive tank comprises, or is connectable with, an additive pump, for transfer of the additive to the supply tank, before or after mixing with a solvent.

In embodiments, the supply unit comprises a solvent tank that is a water tank connected with an additive tank that is a surfactant tank, wherein the surfactant tank is adapted to dose water from the water tank with surfactant, prior to delivery to the supply tank.

Suitably, the centrifuge unit of the second aspect is adapted to separate phases of a mixture comprising the flowable substance, the wash agent delivered by the wash unit apparatus of the first aspect, and particulate fines.

In embodiments, the centrifuge unit comprises, or is connectable with, a delivery pump for obtaining a mixture comprising the flowable substance, the wash agent, and particulate fines. Suitably, the mixture obtained by the delivery pump is the mixture received by the catch tank of the apparatus of the first aspect.

Suitably, the centrifuge unit comprises a decanting centrifuge. In embodiments, the centrifuge unit comprises a three-phase decanting centrifuge.

In embodiments, the centrifuge unit is adapted to separate the mixture obtained from the apparatus comprising the flowable substance, the wash agent, and particulate fines, into a solid phase; a hydrophobic or oil phase; and a hydrophilic or water phase.

Suitable, the centrifuge unit of the system of the second aspect comprises, or is connectable with, one or more containers or tanks for receiving the respective phases produced by the centrifuge.

In embodiments, the centrifuge unit comprises a tank for receiving the oil phase produced by the centrifuge. In embodiments, the centrifuge unit comprises, or is connectable with, a pump connected to the tank for receiving the oil phase, for transfer of the oil phase from the tank.

In embodiments, the centrifuge unit comprises a tank for receiving the water phase produced by the centrifuge. In embodiments, the tank for receiving the water phase produced by the centrifuge is the supply tank of, or connectable to, the wash unit of the apparatus of the first aspect. In an embodiment the tank for receiving the water phase produced by the centrifuge is a different tank.

In embodiments wherein the tank for receiving the water phase produced by the centrifuge is a different tank than the supply tank of, or connectable to, the wash unit of the apparatus of the first aspect, suitably, the centrifuge unit comprises, or is connectable with, a pump for transferring the water phase to the supply tank.

In embodiments, the centrifuge unit comprises, or is connectable with, a centrifuge unit conveyer for transferring the solid phase separated by the centrifuge unit from the centrifuge unit.

In embodiments, the centrifuge unit conveyer is a centrifuge unit screw conveyor or auger.

In embodiments, the centrifuge unit conveyer is located within a centrifuge unit conveyer housing.

In an embodiment, the system of the second aspect comprises:

a rotatable cylindrical screen comprising an inlet adapted to receive drill cuttings combined with drilling mud and an outlet longitudinally spaced from the inlet; and a screw conveyer in fixed connection with the screen and extending within the screen between the inlet and the outlet, wherein rotation of the cylindrical screen and the screw conveyer is adapted to move the drill cuttings along an inner surface of the screen towards the outlet for exit through the outlet;

a vacuum unit comprising a suction head in sprung connection with a portion of an outer surface of the screen at or towards the inlet, the vacuum unit adapted to obtain drilling mud under vacuum through the screen and transfer the drilling mud from the apparatus for re-use;

a wash unit comprising a plurality of manifolds positionable within the cylindrical screen away from the inlet at spaced locations extending towards the outlet, each manifold comprising a plurality of spray openings supplied by a pressurised aqueous surfactant supply tank, the spray openings being adapted to apply a substantially fan-shaped spray of the aqueous surfactant to the drill cuttings within the cylindrical screen;

a catch tank adapted to receive a mixture comprising drilling mud combined with aqueous surfactant and particulate fines that has passed through the cylindrical screen; and a centrifuge unit adapted to receive the mixture comprising drilling mud, aqueous surfactant, and particulate fines received by the catch tank, to separate the drilling mud, aqueous surfactant, and particulate fines into solid, oil, and water phases, and to recycle the water phase separated by the centrifuge unit into the aqueous surfactant supply tank.

A third aspect of the invention provides a method of separating particles from a flowable substance, including the steps of:

placing particles combined with a flowable substance on a moving screen comprising an inner surface and an outer surface;

moving the particles along the inner surface of the screen;

passing at least a first portion of the flowable substance through the inner surface to the outer surface of the screen;

adding a wash agent to the particles; and obtaining particles separated from the flowable substance from the screen, to thereby separate the particles from the flowable substance.

In an embodiment, the particles separated according to the method of the third aspect are drill cuttings. In an embodiment, the flowable substance from which the particles, such as drill cuttings, are separated is drilling fluid or drilling mud.

Suitably, the particles combined with the flowable substance are placed on the screen past an inlet of, or connected to, an inlet end of the screen. Suitably, the particles separated from the flowable substance are obtained from the screen past an outlet of, or connected to, an outlet end of the screen.

Suitably, movement of the screen assists with separation of the particles from the flowable substance according to the method of this aspect. Suitably, movement of the screen assists with passing of the first portion of the flowable substance through the screen.

In an embodiment of the method of this aspect, the particles combined with the flowable substance are placed on a turning screen. In an embodiment, the particles are placed on a rotating screen. In embodiments, the screen is a cylindrical screen. In embodiments, the screen is enclosed except at the inlet end and the outlet end.

In an embodiment, the method of this aspect includes the step of conveying the particles along the screen using a conveyer. In embodiments, the particles are conveyed along the screen using a screw conveyer. In embodiments, the screw conveyer is in fixed connection with the screen.

In an embodiment of the method of this aspect, the step of passing the first portion of the flowable substance through the inner surface of the screen to the outer surface of the screen includes applying a vacuum to the flowable substance to draw the flowable substance through the screen. Suitably, the vacuum is applied to the outer surface of the screen.

In embodiments, the first portion of the flowable substance that is passed through the screen does not comprise, or does not substantially comprise, the wash agent. Suitably, the first portion has not been contacted, or has not substantially been contacted, by the wash agent prior to passage through the screen.

In an embodiment, the method includes the step of transferring at least some of the first portion of the flowable substance that is passed through the screen for further processing and/or re-use.

In an embodiment, the step of adding the wash agent to the particles according to the method of this aspect includes spraying the wash agent onto the particles under pressure. Suitably, spraying the wash agent onto the particles under pressure assists with separation of the particles from the flowable substance.

In an embodiment, the method of the third aspect includes the step of passing a second portion of the flowable substance through the screen. Suitably, the second portion of the flowable substance is passed through the screen after addition of the wash agent to the particles.

Suitably, the second portion of the flowable substance passed through the screen is of a mixture comprising the wash agent. The mixture may further comprise particulate fines.

In embodiments, the method of the third aspect includes the step of blowing the particles, such as blowing with air. Suitably air is blown onto the particles after addition of the wash agent to the particles. Suitably, the step of blowing the particles facilitates passing of the second portion of the flowable substance, the wash agent, and/or particulate fines, through the screen.

In an embodiment, the method of the third aspect includes the step of separating the mixture comprising the second portion of the flowable substance passed through the screen, into phases. Suitably, the step of separating the mixture includes centrifuging the mixture. In embodiments, the mixture is separated into a solid phase, an oil phase, and a water phase.

In an embodiment, the method of the third aspect includes the step of recycling the oil phase separated from the mixture. In embodiments, wherein the flowable substance is drilling mud, the oil phase may be recycled as drilling mud.

In an embodiment, the method of the third aspect includes the step of recycling the water phase separated from the mixture. In embodiments, the water phase is recycled as wash agent.

BRIEF DESCRIPTION OF THE DRAWINGS

The invention will be described hereinafter with reference to typical embodiments illustrated in the drawings and wherein:

In FIG. 1, apparatus 10 is located within a frame, frame 2.

In FIG. 6, centrifuge unit 25 is located within a frame, frame 3.

DESCRIPTION OF THE EMBODIMENT

Figure 1:
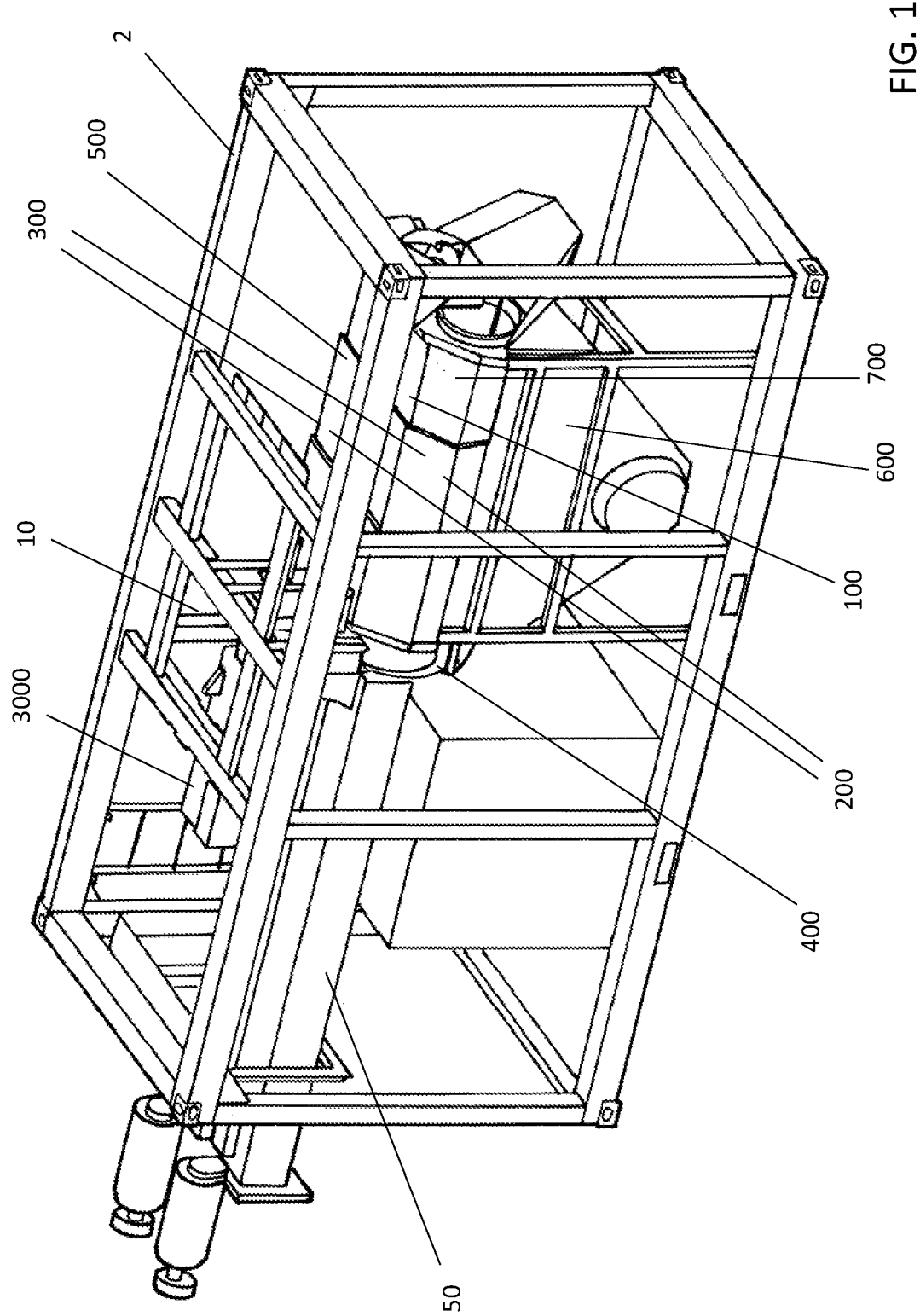
FIG. 1 sets forth a first perspective view of an embodiment of an apparatus of the invention, apparatus 10.

Set forth in the figures are apparatus 10, and system 1 comprising apparatus 10, for separating drill cuttings from drilling mud, such as oil-based drilling mud (OBM).

Apparatus 10 comprises inlet control 50; housing 100; two rotatable cylindrical screens 200; two screw conveyers 300; vacuum unit 400; wash unit 500; catch tank 600; and blower unit 700.

Figure 2:
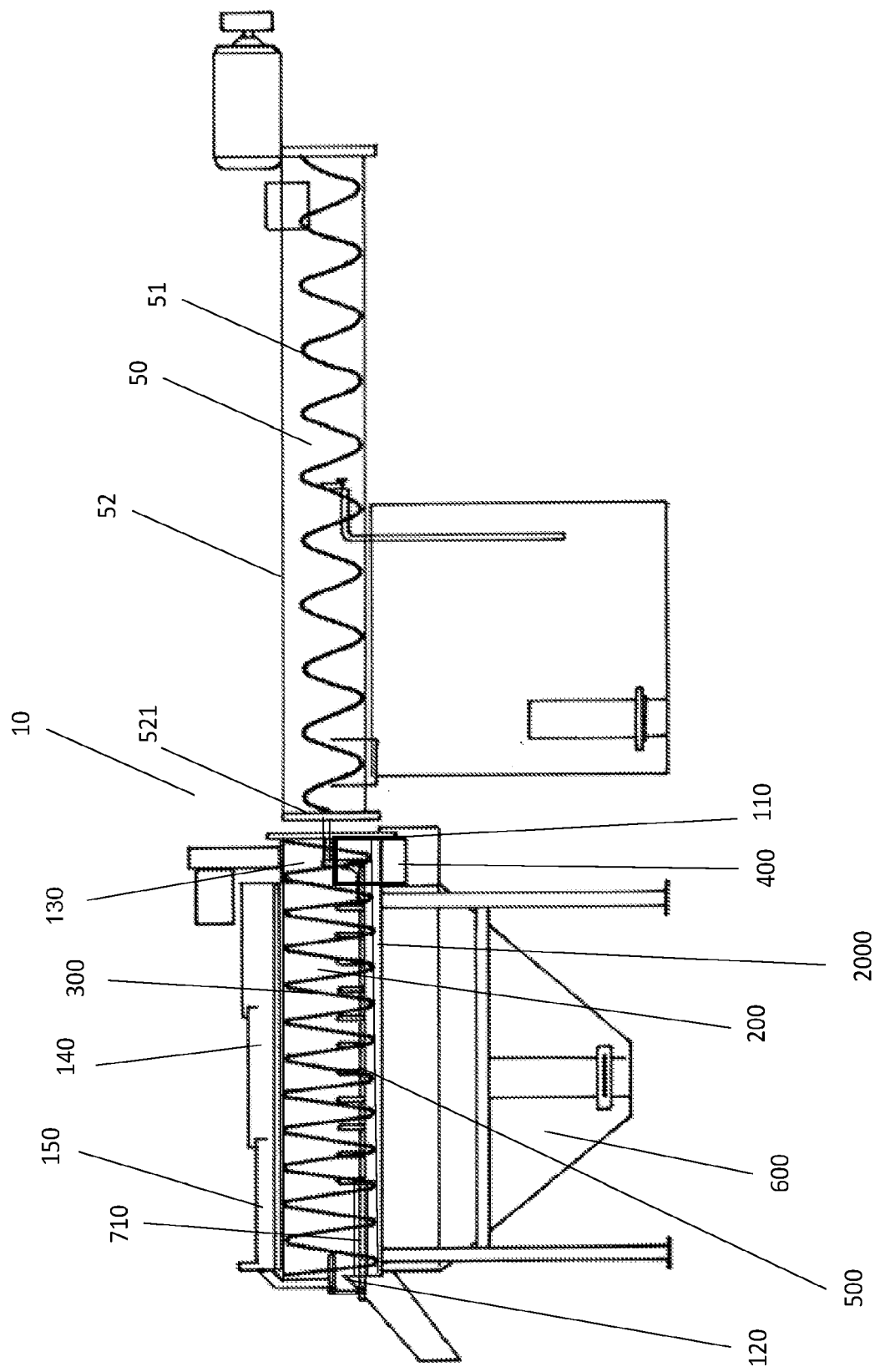
FIG. 2 sets forth a diagrammatic side view of the apparatus of FIG. 1.
Figure 3:
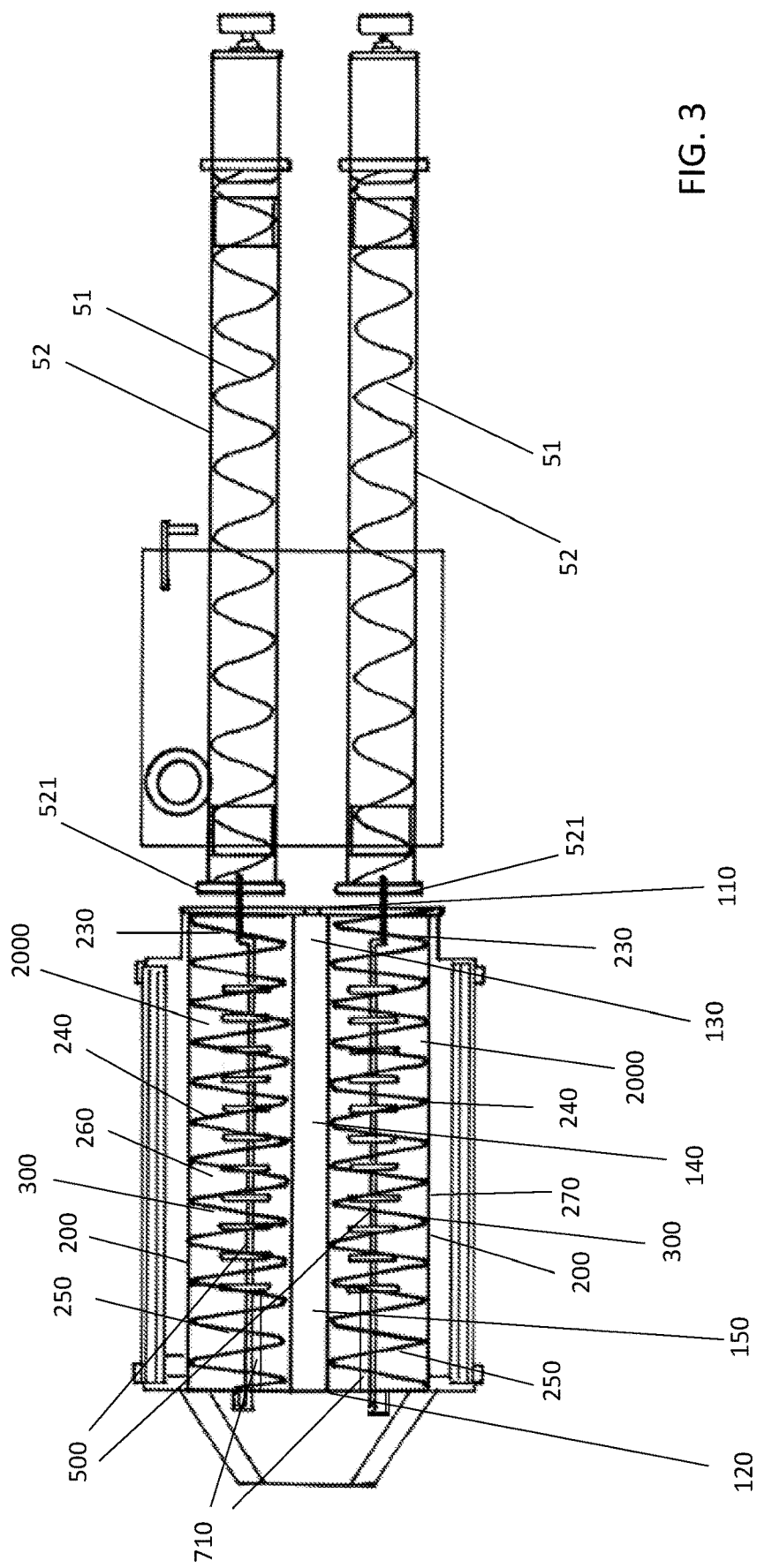
FIG. 3 sets forth a diagrammatic top view of the apparatus of FIG. 1.

As best seen in FIG. 2 and FIG. 3, inlet control 50 of apparatus 10 comprises two inlet control screw conveyers 51; and inlet control housing 52. Inlet control screw conveyers 51 are positioned in a side-by-side, substantially horizontal orientation within discrete chambers of inlet control housing 52. The discrete chambers of inlet control housing comprise respective inlet control outlet ends 521. Inlet control outlet ends 521 are substantially cylindrical in shape. Inlet control screw conveyers 51 are rotatable about longitudinal axes within housing 52. Each inlet control screw conveyer 51 is mounted for motor-driven rotation within inlet control housing 52. Rotation of screw conveyers 51 is controlled by variable frequency drive 3000.

Housing 100 of apparatus 10 comprises housing inlet end 110; housing outlet end 120; vacuum housing portion 130; wash housing portion 140; and blower housing portion 150. Vacuum housing portion 130 extends longitudinally from housing inlet end 110 to wash housing portion 140. Wash housing portion 140 extends longitudinally from vacuum housing portion 130 to blower housing portion 150. Blower housing portion 150 extends longitudinally from wash housing portion 140 to housing outlet end 120.

Cylindrical screens 200 are connectable with respective inlet control screw conveyers 51. Cylindrical screens 200 of apparatus 10 are located in a side-by-side, substantially horizontal, orientation within housing 100. Screens 200 are rotatable screens, rotatable about longitudinal axes within housing 100. Screens 200 extend longitudinally through vacuum housing portion 130, wash unit housing portion 140, and blower housing portion 150. Each screen 200 comprises inlet end 210; outlet end 220. Inlet end of 210 is substantially cylindrical and shaped to receive respective outlet end 521 of inlet control housing 52. Each screen 200 comprises vacuum screen portion 230 (within vacuum housing portion 130); wash screen portion 240 (within wash housing portion 140); and blower screen portion 250 (within blower housing portion 150). Each screen 200 comprises inner surface 260 and outer surface 270. Each screen 200 comprises 2 mm diameter apertures (not shown), extending through inner surface 260 and outer surface 270, across about 50% of the inner and outer surfaces.

In apparatus 10, the respective vacuum (130 and 230), wash (140 and 240), and blower (150 and 250) portions of housing 100 and screen 200 are substantially the same length. The ratio of the length of the respective vacuum (130 and 230), wash 140 and 240), and blower (150 and 250) portions of housing 100 and screen 200 is about 1 to 8.5 to 1.5.

Figure 4:
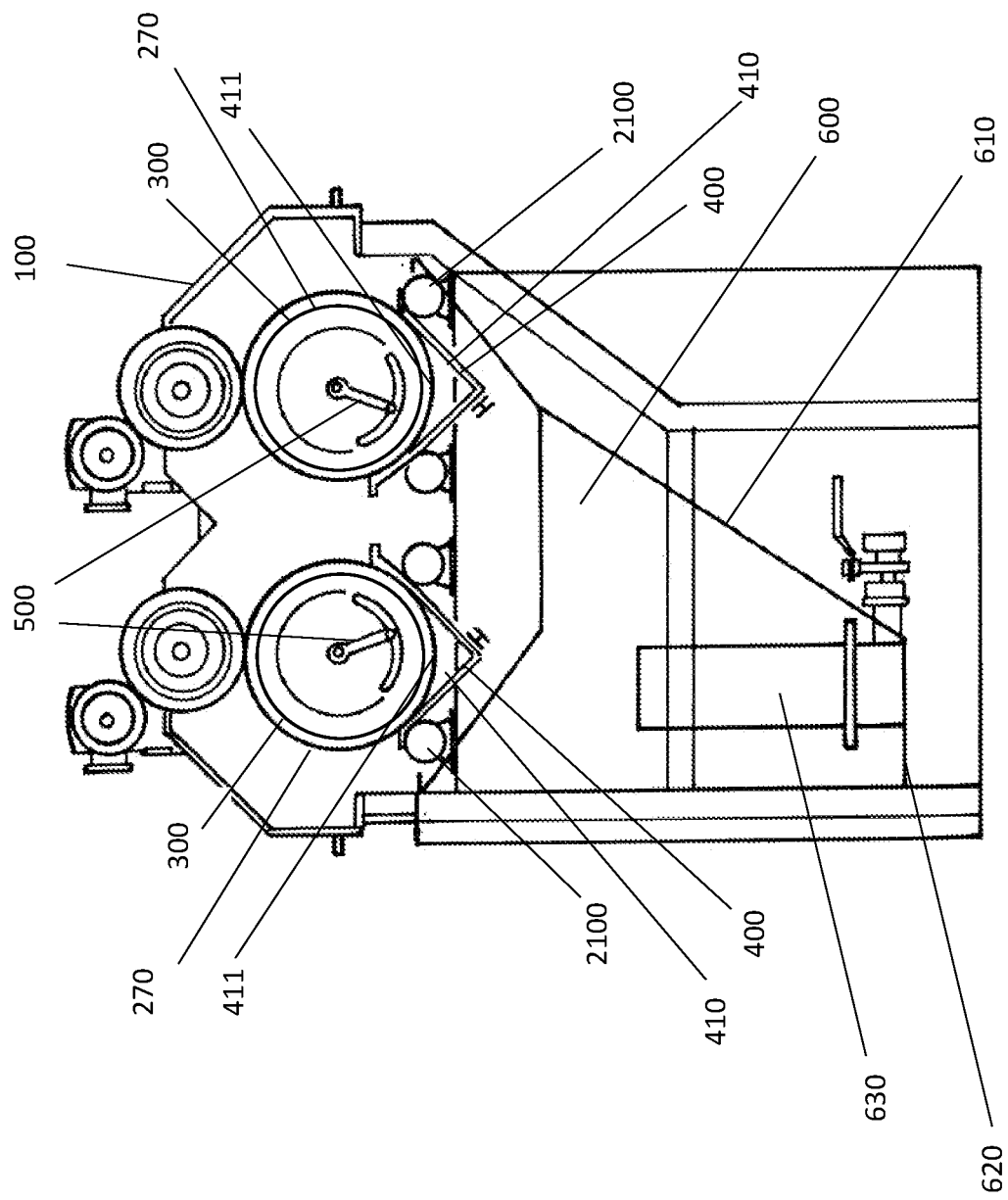
FIG. 4 sets forth a diagrammatic rear view of the apparatus of FIG. 1.

Screw conveyers 300 of apparatus 10 extend from inlet end 210 to outlet end 220 within each screen 200. Screw conveyers 300 are shaftless and in fixed connection with inner surface 260 of screens 200. The fixed connection between each screen 200 and each screw conveyer 300 forms respective rotatable units 2000. Rotatable units 2000 are mounted for independently motor-driven counterrotation within housing 50, controlled by variable frequency drive 3000. As best seen in FIG. 4, each rotatable unit 2000 is supported by rolling support rings 2100 located at inlet end 210 and outlet end 220, and approximately centrally, adjacent outer surface 270 of screen 200.

As best seen in FIG. 2 and FIG. 4, Vacuum unit 400 of apparatus 10 comprises respective suction heads 410; and two compressed air powered venturi operated pumps that function out of phase (not shown) to supply suction through suction head 410. Suction heads 410 are located within vacuum housing portion 130 of housing 100. Suction heads 410 connect with outer surface 270 of respective screens 200, along substantially the full length of vacuum screen portion 230 of screen 200. Each suction head 410 comprises suction pad 411. Each suction head 410 is spring mounted such that suction pad 411 lies adjacent outer surface 270 of cylindrical screen 200. Suction pad 411 of vacuum unit 400 connects with approximately 40% of the perimeter of outer surface 270 of screen 200, slightly offset with respect to a lowest point of outer surface 270, in the direction of screen rotation.

Figure 5:
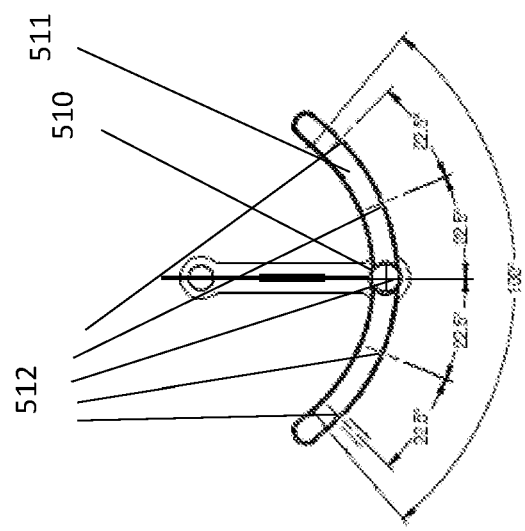
FIG. 5 sets forth (A) a perspective view; and (B) a rear view of components of a wash unit 500 of the apparatus of FIG. 1.
Figure 5:
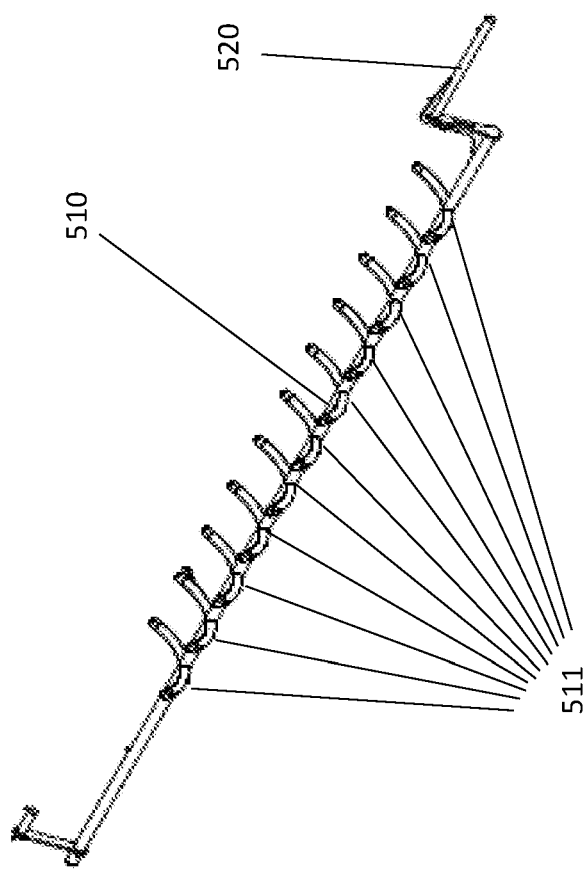

As best seen in FIG. 3 and FIG. 5, wash unit 500 of apparatus 10 comprises two feeder pipes 510 for supply of spray openings 512; and two wash unit actuators 520 connected with each respective feeder pipe 510. Feeder pipes 510 are pivotally connected with each respective rotatable unit 2000 of apparatus 10, and extend longitudinally within respective screens 200. Wash unit actuators 520 are in fixed connection with respective feeder pipes 510. Spray openings 512 of wash unit 10 are adapted to deliver wash agent towards inner surface 260, along wash portion 250, of screen 200. Each feeder pipe 510 supplies eleven manifolds 511, each manifold comprising four spray openings 512. Manifolds 511 of wash unit 500 are substantially evenly spaced within wash screen portion 240 of each screen 200. Manifolds 511 are curved substantially coaxially within inner surface 260 of screen 200. A single spray opening 512 is located along feeder pipe 510 after each manifold 511. In total, for each screen 200, wash unit 500 comprises fifty-five spray openings 512. The pressure of the delivery of wash agent from spray openings 512 can be adjusted, and is under control by variable frequency drive 3000.

Catch tank 600 of apparatus 10 is connected to housing 100. A single catch tank 600 extends below both cylindrical screens 200, along wash screen portion 240 and blower screen portion 250. As best seen in FIG. 4, catch tank 600 comprises inclined catch tank wall 610; catch tank floor 620; and catch tank pump 630. Inclined catch tank wall 610 is inclined at an angle of about 65° towards catch tank floor 620. Catch tank pump 630 is located at catch tank floor 620. Catch tank pump 630 is a submersible open vortex impeller pump.

Blower unit 700 of apparatus 10 comprises blower outlets 710; and a turbine (not shown) for delivering air through blower outlets 710. Blower outlets 710 are air blade or air knife arrangements, extending longitudinally within blower portions 250 of screens 200. Blower outlets 710 are attached to feeder pipes 510 of wash units 500. Typically, a single turbine is mounted to catch tank 600, and connected to blower outlets 710 such as by a 50 mm air duct.

System 1, comprising apparatus 10, will now be described.

Figure 6:
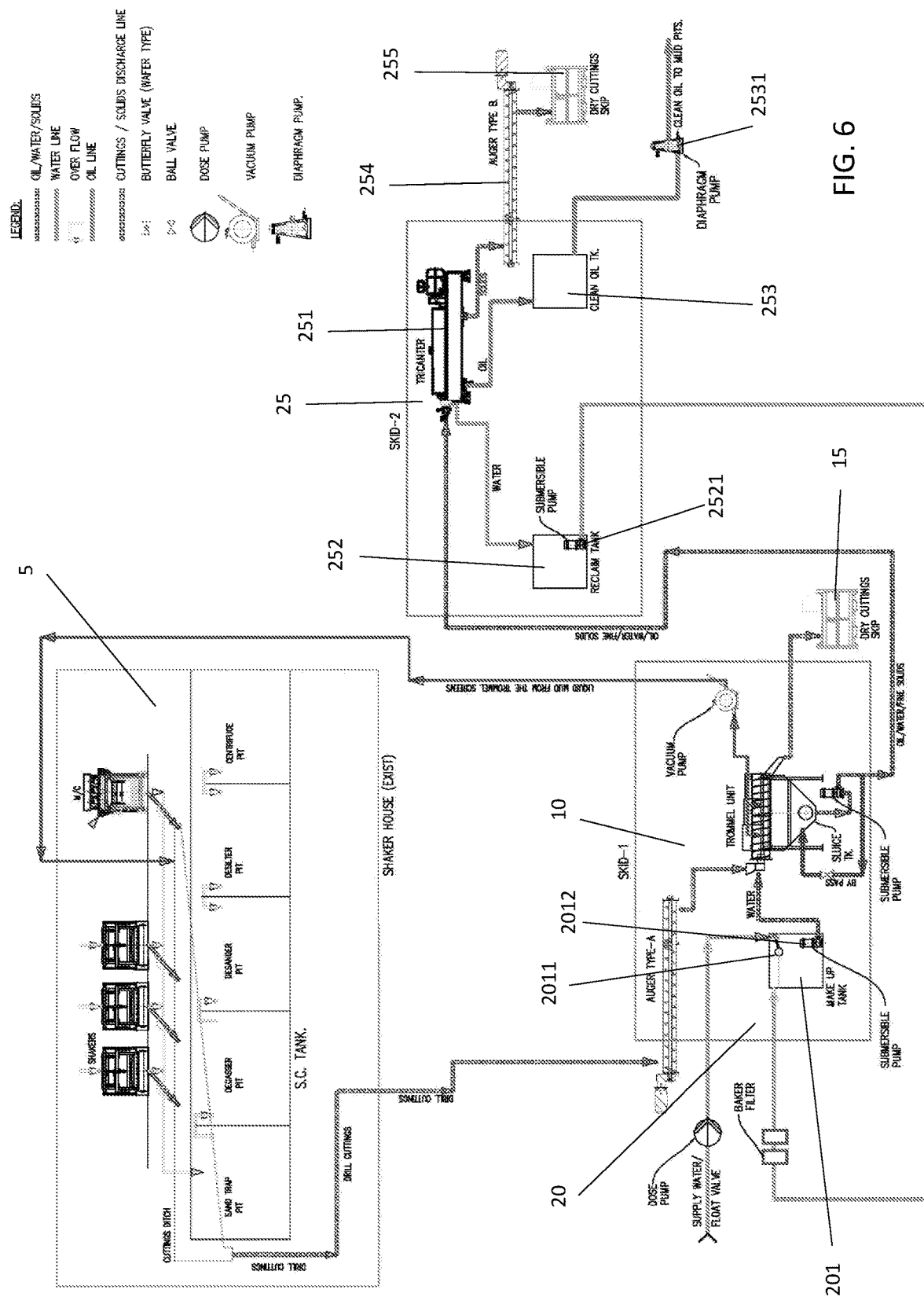
FIG. 6 sets forth a schematic view of a system of the invention, system 1.

As best seen in FIG. 6, system 1 comprises apparatus 10; supply unit 20; and centrifuge unit 25.

Apparatus 10 of system 1 is substantially as described above.

Supply unit 20 of system 1 comprises supply tank 201. Supply unit 20 may further comprise, or be connectable with, a water container or tank (not shown); and/or a surfactant container or tank (not shown).

Supply tank 201 of supply unit 20 is a tank arrangement for storing and transferring aqueous surfactant. Supply tank 201 of supply unit 20 comprises float valve 2011; and supply pump 2012. Supply pump 2012 is a submersible open vortex impeller pump, connectable with wash unit 500 of apparatus 10.

Where present, the water container of supply unit 20 is an arrangement for storing and transferring water. The water container will typically comprise a water pump, connectable with supply tank 201.

Where present, the surfactant container of supply unit 20 is an arrangement for storing and transferring surfactant. The surfactant container will typically comprise a dose meter, and surfactant pump.

Typically, the water container and surfactant container are configured such that water from the water container is dosed with surfactant from the surfactant container to form aqueous surfactant, prior to transfer to supply tank 201.

Figure 7:
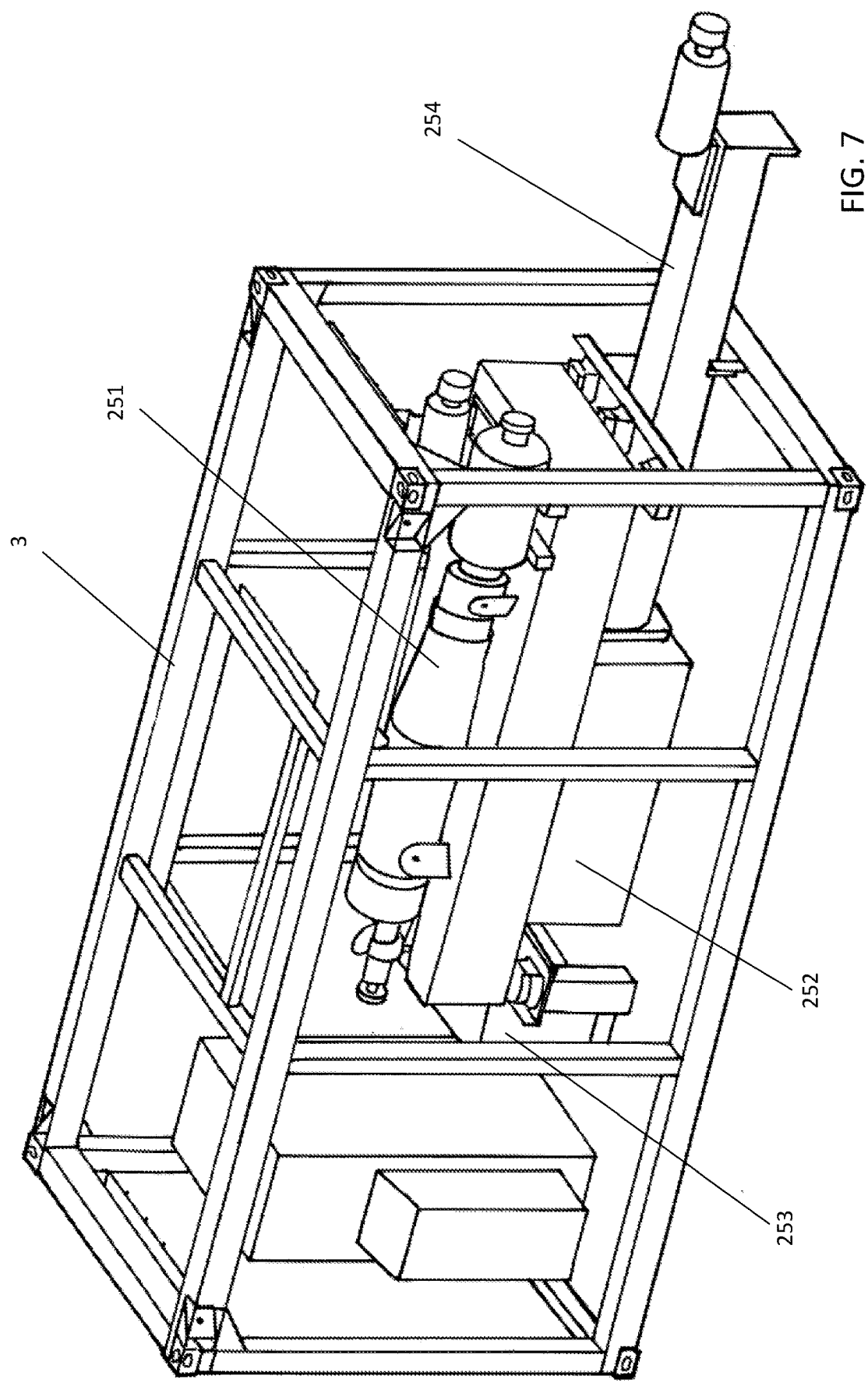
FIG. 7 sets forth a perspective view of an embodiment of a centrifuge unit, centrifuge unit 25, of system 1 of the invention.
Figure 8:
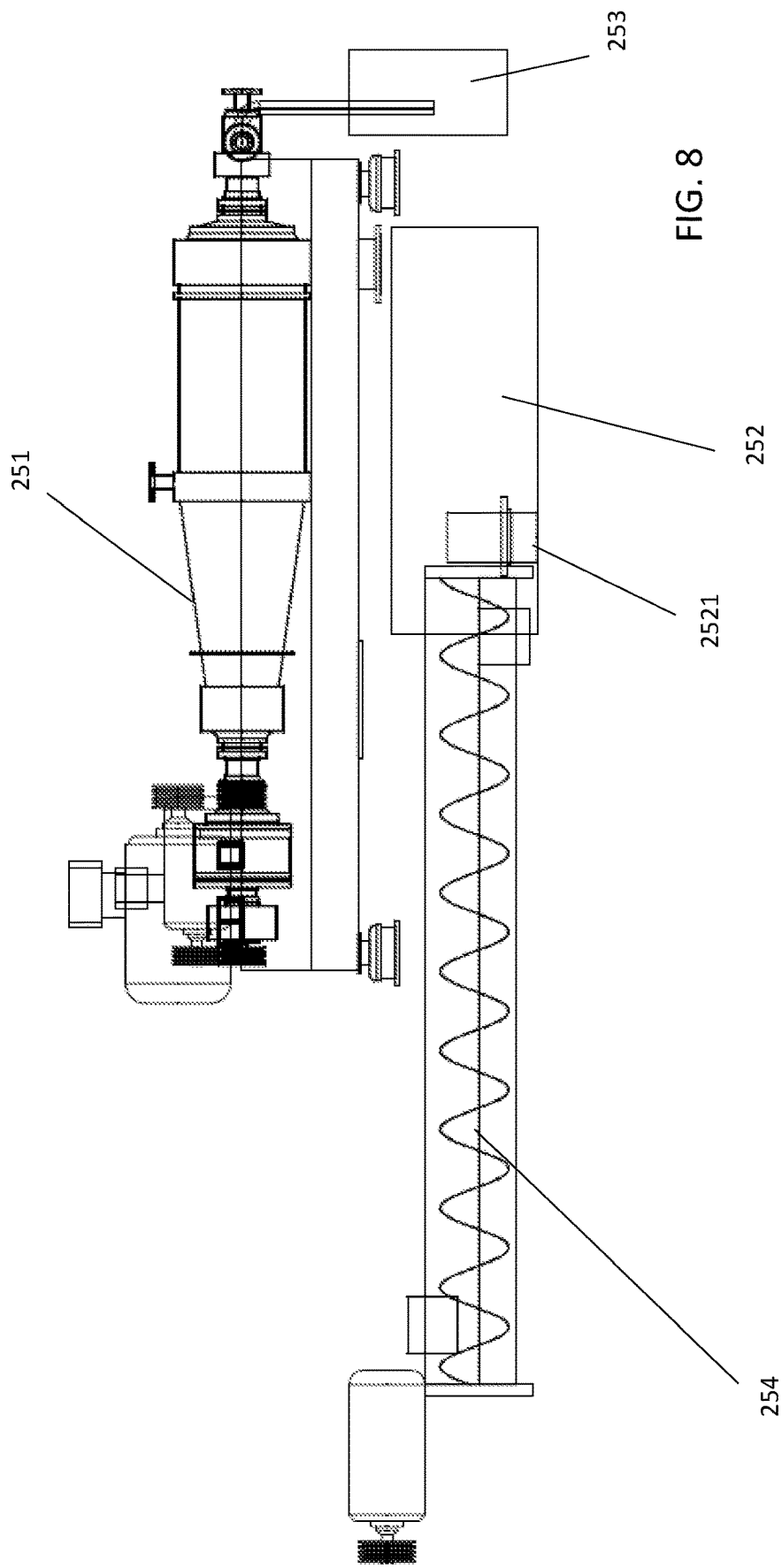
FIG. 8 sets forth a diagrammatic side view of the centrifuge unit of FIG. 7.
Figure 9:
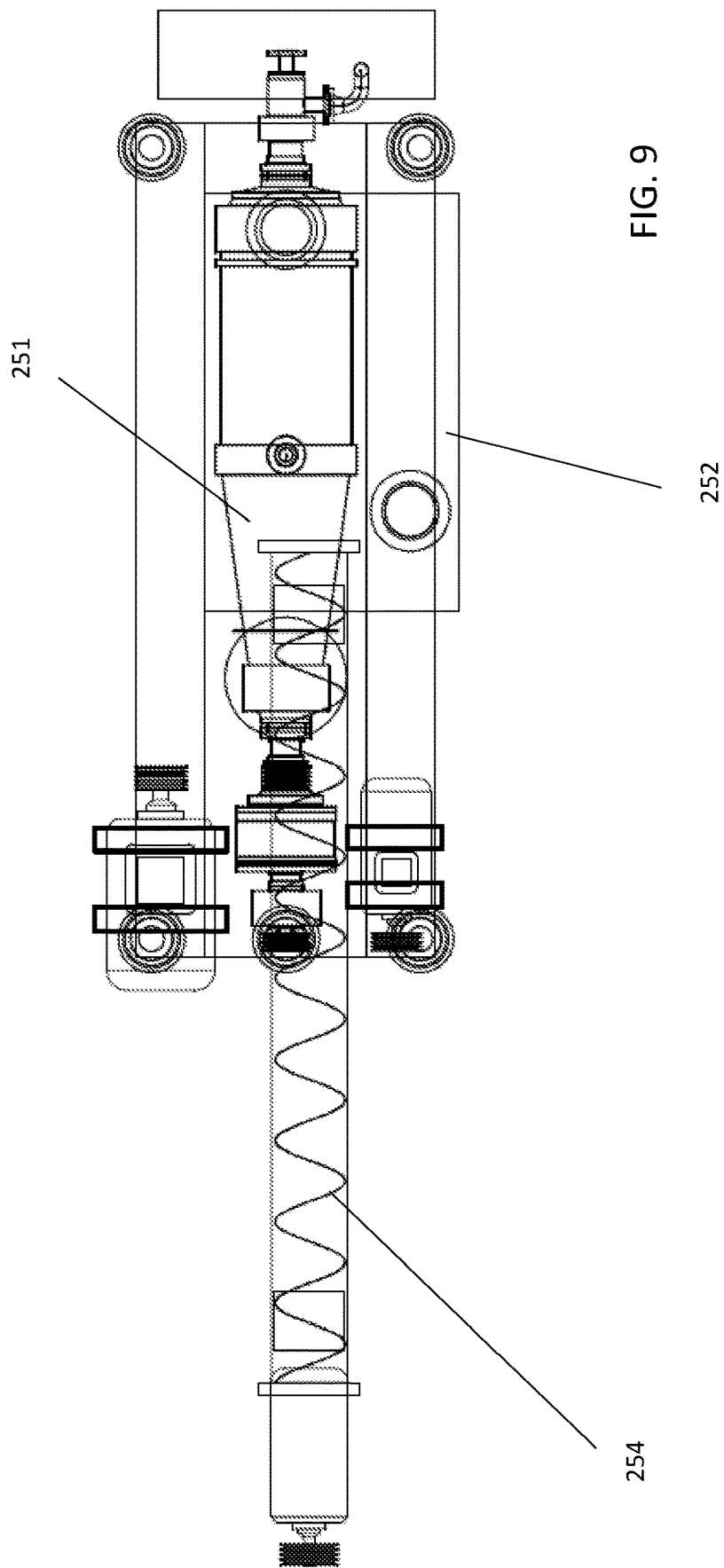
FIG. 9 sets forth a diagrammatic top view of the centrifuge unit of FIG. 7.

As best seen in FIG. 6 and FIG. 7, centrifuge unit 25 of system 1 comprises three-phase decanting centrifuge 251. Centrifuge unit 25 further comprises, or is connectable with, reclaim tank 252; oil storage tank 253; centrifuge unit screw conveyer 254; and centrifuge unit cuttings bin 255.

Three-phase centrifuge 251 of centrifuge unit 25 is a Tricanter centrifuge, as manufactured by Flottweg Separation Technology.

Reclaim tank 252 of centrifuge unit 25 is a tank arrangement for storing and transferring aqueous solution. Reclaim tank 252 comprises reclaim tank pump 2521. Reclaim tank 252 is connectable with three-phase centrifuge 251; and supply tank 201 of supply unit 20.

Oil storage tank 253 of centrifuge unit 25 is a tank arrangement for storing and transferring drilling mud. Oil storage tank 253 comprises oil transfer pump 2531. Oil storage tank 253 is connectable with three-phase centrifuge 251. Oil transfer pump 2531 is a diaphragm pump.

Screw conveyer 254 of centrifuge unit 25 is for conveying particulate fines. Screw conveyer 254 is connectable with three-phase centrifuge 251.

Centrifuge unit cuttings bin 255 of centrifuge unit 25, is a container for receiving processed particulate fines. Centrifuge unit cuttings bin 255 is connectable with screw conveyer 254.

System 1 may further comprise pre-treatment unit 5. Pre-treatment unit 5 of system 1 is a shaker house as are known in the art, comprising shakers; a sand trap pit; a degasser pit; a desander pit; a desilter pit; a centrifuge pit; a cuttings ditch; and an auger. Pre-treatment unit 5 of system 1 will be connectable with inlet control 50 of apparatus 10.

System 1 may further comprise cutting bin 15. Cuttings bin 15 is a container for receiving processed drill cuttings. Cuttings bin 15 will be connectable with outlet end 220 of screen 200 of apparatus 10.

Exemplary use of system 1, and apparatus 10 thereof, will now be described.

In use, drill cuttings combined with drilling mud are delivered to inlet control 50 of apparatus 10. Typically, drilling mud is processed by pre-treatment unit 5 of system 1, prior to delivery to inlet control 50.

In use, inlet control 50 is arranged to engage with screen 200 of apparatus 10. Inlet control 50 is engaged with screen 200 by insertion of respective inlet control outlet ends 521 of inlet control housing 52 into respective inlet ends 210 of respective screens 200, in a substantially fitting arrangement. Typically, outlet ends 521 are inserted between about 80 mm to about 120 mm within inlet ends 210.

In use, rotation of inlet control screw conveyers 51 of inlet control 50 is controlled by variable frequency drive 3000. Rotation of inlet control screw conveyers 51 is set to deliver drill cuttings combined with drilling mud substantially evenly from each screw conveyer 51 to respective screens 200. Typically, inlet control 50 delivers drill cuttings combined with drilling mud to screens 200 at a total rate of about 20 to 40 tonnes per hour, such as 30 tonnes per hour, or 10 to 20 tonnes per hour per screen 200, such as 15 tonnes per hour per screen 200.

In use, inlet ends 210 of respective screens 200 receive drill cutting combined with drilling mud conveyed by inlet control screw conveyers 51.

In use, rotation of rotatable units 2000, comprising screens 200 and screw conveyers 300, is controlled by variable frequency drive 3000 at a rate of between about 7 and about 18 rpm. Rotation of rotatable units 2000, comprising screens 200 and screw conveyers 300, tumbles the drill cuttings combined with drilling mud within screens 200. The bulk of the tumbling drill cuttings combined with drilling mud settles in a position slightly offset from the lowest point of screens 200, in the direction of rotation. Tumbling of the drill cuttings combined with drilling mud within screen 200 assists with separation of the drill cuttings from the drilling mud, and with passing drilling mud through screens 200.

In use, rotation of rotatable units 2000, comprising screens 200 and screw conveyers 300, forces the drill cuttings combined with drilling mud against screw conveyers 300. Forcing of the drill cuttings combined with drilling mud against screw conveyers 300 facilitates transfer of drill cuttings from inlet ends 210 of screens 200, to outlet ends 220 of screens 200.

In use, vacuum unit 400 of apparatus 10 obtains a portion of drilling mud through screens 200 under vacuum. The vacuum pumps of vacuum unit 400 apply suction through suction pad 411 along vacuum screen portion 230 of screen 200. Spring mounting of suction heads 410, comprising suctions pads 411, facilitates maintaining connection of suctions pads 411 with outer surface 270 of screens 200, as rotatable units 2000 comprising screens 200 rotate. In use, drilling mud obtained through screens 200 by suction pads 411 is transferred under vacuum by vacuum unit 200 for further processing, typically to pre-treatment unit 5.

In use, wash unit 500 of apparatus 10 delivers aqueous surfactant spray under pressure to the drill cuttings combined with drilling mud, within screens 200. The pressure at which the aqueous surfactant is delivered is controlled by variable frequency drive between about 45 psi and about 70 psi. Aqueous surfactant spray is delivered under pressure through openings 512 of wash unit 500, along wash screen portion 240 of screen 200. Each of the eleven manifolds 511 comprising four spray openings 512 deliver a substantially fan-shaped pressure spray towards inner surface 260 of each screen 200, at the eleven respective positions of spray pipes 511. Additionally, each of the eleven spray openings 512 located along feeder pipe 510 deliver a pressure jet spray at the respective positions between spray pipes 511. Total rate of delivery of aqueous surfactant through openings 512 is typically between about 100 to about 300 litres per minute. The aqueous surfactant delivered under pressure by wash unit 500 contacts the drill cuttings, assisting with separation of the drill cuttings from the drilling mud.

In use, feeder pipe 510 of wash unit 500 can be pivoted using actuator 520, to adjust the position of spray openings 512 axially relative to inner surface 260 of screen 200 using actuator 520. Adjusting the position of spray openings 512 allows for the aqueous surfactant spray to be concentrated on the bulk of the tumbling cuttings within screen 200. Typically, the position of spray openings 512 is adjusted prior to engagement of inlet control 50 with screen 200. Typically, when inlet control 50 is engaged with screen 200, actuator 520 is secured within a slot (not shown) of inlet control housing 52. Secured engagement between actuator 520 and inlet control housing 52 substantially maintains the adjusted position of spray openings 512.

In use, catch tank 600 of apparatus 10 receives a mixture comprising the drilling mud that was not obtained by vacuum unit 400 through vacuum screen portion 230, in combination with the aqueous surfactant delivered by wash unit 500, and particulate fines that are small enough to pass through the apertures of screens 200. Drilling mud removed from the particles, aqueous surfactant delivered by wash unit 500, and particulate fines, pass through screens 200 into catch tank 600. Inclined catch tank wall 610 assists with directing the drilling mud, aqueous surfactant, and particulate fines towards catch tank floor 620, comprising catch tank pump 630. Catch tank pump 630 located at catch tank floor 620 transfers the mixture received by catch tank 600 to centrifuge unit 25 of system 1.

In use, blower unit 700 facilitates transfer of residual drilling mud, aqueous surfactant, and/or particulate fines within screen 200 to catch tank 600. The turbine of blower unit 700 delivers air flow from blower outlet 710 towards inner surface 260 along blower screen portion 250 of screen 200. Air flow from blower outlets 710 facilitates transfer of drilling mud, aqueous surfactant, and/or particulate fines within screen 200 to catch tank 600 along blower screen portion 250, wherein transfer did not occur along wash screen portion 240. In use, adjustment of the position of spray openings 512 by pivoting feeder pipe 510 using actuator 520 also adjusts the position of blower outlet 710, to focus air blown from blower outlet 710 on the bulk of the tumbling cuttings.

In use, cuttings bin 15 of system 1 receives drill cuttings processed by apparatus 10 through outlet ends 220 of screens 200. Cuttings within cuttings bin 15 can be disposed of directly, or transferred for further processing.

In use, supply unit 20 of system 1 replenishes and mixes aqueous surfactant, and supplies the aqueous surfactant to wash unit 500 of apparatus 10. Supply tank 201 receives and stores the aqueous surfactant. Supply tank pump 2011 delivers the aqueous surfactant under pressure from supply tank 201 to feeder pipes 510 of wash unit 500. Typically, supply tank 201 receives water from a water container of supply unit 20, wherein the water is dosed with surfactant from a surfactant container of supply unit 20 at a concentration of about 2%. The dosed water assists with maintaining the supply of aqueous surfactant in supply tank 201, and is received by supply tank 201 under regulation by float valve 2021 to maintain volume within supply tank 201. The dosed water is typically received by supply tank 201 through an outlet (not shown) below the surface of the aqueous surfactant within supply tank 201.

In use, centrifuge unit 25 of system 1 receives the mixture comprising the drilling mud in combination with the aqueous surfactant and particulate fines from catch tank 700 of apparatus 10, and distributes the separated phases. Three-phase centrifuge 251 receives the mixture delivered by catch tank pump 710 of catch tank 700, and separates the mixture into a solid phase, an oil phase, and a water phase. The water phase separated by three-phase centrifuge 251, comprising the aqueous surfactant, is transferred to reclaim tank 252 of, or connected to, centrifuge unit 25. The water phase is then recycled to supply tank 201 of supply unit 20. The oil phase separated by three-phase centrifuge 251, comprising the drilling mud, is transferred to oil storage tank 253 of, or connected to, centrifuge unit 25. The oil phase is then recycled as drilling mud, for further drilling. The solid phase separated by three-phase centrifuge 251, comprising particulate fines, is transferred to screw conveyer 254 of, or connected to, centrifuge unit 25. The solid phase is then conveyed by screw conveyer 254, to centrifuge unit cutting bin 255.

Certain advantages of, and alternatives to, apparatus 10 and system 1 will now be described, although without limitation.

Advantageously, apparatus 10 and system 1 as described herein have been found to consistently deliver processed drill cuttings containing less than 5% Oil-on-Cuttings (OOC). More particularly, processed drill cuttings containing between about 1% and less than 5% OOC have been observed. Advantageously, this degree of separation of drilling mud from drill cuttings has been achieved at a rate of up to 30 or even 40 tonnes per hour, with continuous processing. In terms of the weight of cuttings, apparatus 10 and system 1 as described herein have been found to be capable of processing up to about 4 kg of cuttings per second.

Advantageously, the observed degree of separation of drill cuttings from drilling mud, i.e. less than 5% OOC, using apparatus 10 and system 1, will frequently be sufficient to allow for direct disposal of drill cuttings, e.g. by dumping overboard, and is considered environmentally acceptable from a regulatory perspective in many jurisdictions. Furthermore, separated drill cuttings produced using apparatus 10 and system 1 can be highly advantageous for further processing, such as using cuttings re-injection (CRI), Thermal Desorption Unit (TDU), microwave-based, or VERTI-G dryer technology, or similar.

Although the use of system 1 and apparatus 10 has been described in the context of processing of drill cuttings combined with drilling mud sourced from pre-processing unit 5, other suitable sources of drill cuttings combined with drilling mud may be processed. For example, legacy material in the form of drill cuttings previously disposed of in pits or other land fill can readily be processed using system 1 and apparatus 10. Furthermore, removal of solid particles from oil-based flowable substances can have application in other contexts. By way of example, it can be desirable to remove solid particles from hydraulic oil, lubrication oil, gear oil, quenching oil, etc. The skilled person will appreciate that systems and apparatus of the invention, or minor modifications thereof, may have application in these contexts.

The skilled person will further appreciate that, although apparatus 10 and system 1 have been described primarily in the context of removal of drill cuttings from oil-based mud (OBM), systems and apparatus of the invention should also have application for removal of drill cuttings from water-based mud (WBM). It is expected that the arrangement of apparatus 10 and system 1, including washing using aqueous surfactant, would be effective for removing drill cuttings from WBM. The skilled person would appreciate that, where drill cuttings are separated from WBM, the mixture received by centrifuge unit 25 would not typically comprise any substantial oil. Accordingly, separation by centrifuge unit 25 into two phases, an aqueous phase and a solid phase, would typically be required. As such, in alternative embodiments wherein system 1 was used to remove drill cuttings from WBM, a two-phase centrifuge could be included as part of centrifuge unit 25.

The inlet control 50 of apparatus 10 is considered advantageous for processing efficiency using apparatus 10 and system 1. In particular, inlet control 100 can be of assistance with maintaining a desired input rate into screens 200 of apparatus 10 of between about 20 and 40 tonnes per hour, split approximately evenly between each respective screen 200. Nevertheless, it will be appreciated that alternative embodiments of apparatus 10 may lack inlet control 50, with the drill cuttings combined with drilling mud entering inlet end 210 of screen 200 via a simple inlet chute, for example.

The use of apertures extending through inner surface 260 and outer surface 270 of screen 200, wherein the apertures are 2 mm in diameter and placed over 50% of the screen surface area, has been observed to be advantageous for separating drilling mud from drill cuttings. However, some variation to the apertures may be made without substantially affecting performance. It may further be desirable to alter aperture properties to suit different particles and/or flowable substances, where desired.

Advantageously, the use of rotatable cyclindrical screens 200 of rotatable unit 2000 of apparatus 10 has been observed to be highly effective for continuous processing of drill cuttings, wherein the cuttings are turned without substantial breakage. This has also been observed to be advantageous for exposing all sides of the drill cuttings to washing, such as using wash unit 400. As described herein, respective rotatable units 2000 comprising cylindrical screens 200 are independently driven for counterrotation. However, in alternative embodiments rotatable units 2000 may be corotating and/or driven by a combined drive.

Advantageously, the rate of rotation of rotatable units 2000 comprising cylindrical screens can be adjusted by variable frequency drive, typically between about 5 and about 20 rpm, including about 6, 7, 8, 9, 10, 11, 12, 13, 14, 15, 16, 17, 18, and 19 rpm. The ability to adjust the rate of rotation is advantageous for dealing with variation in drilling material to be processed. It will be appreciated that varying the rate of rotation can also adjust residence time of the drill cuttings within screen 200.

Cylindrical screens 200 of apparatus 10 typically have about 500 mm diameter and about 2200 mm length. These dimensions have been found to be particularly advantageous for achieving desirable degrees of removal of drilling mud from drill cuttings, and for achieving desirable rates of continuous processing. However, some variation to these dimensions may be made without substantially affecting efficacy of processing. Typically, the diameter of cylindrical screens 200 will fall within the range of about 400 mm to about 800 mm, including about 400, 450, 500, 550, 600, 650, 700, and 750 mm. Typically, the length of cylindrical screen 100 will fall within the range of about 1200 mm to about 3200 mm, including about 1400, 1600, 1800, 2000, 2200, 2400, 2600, 2800, and 3000 mm.

As described, rotatable screens 200 can be separated, for descriptive purposes, into vacuum screen portion 230; wash screen portion 240; and blower screen portion 250. For clarity, it will be understood that the properties of the screen itself are substantially the same across the full length of the screen. Reference to the aforementioned screen portions is a reference to processing occurring within the respective portions, with vacuum applied by vacuum unit 400 within vacuum screen portion 230; wash agent applied by wash unit 500 within wash screen portion 240; and blowing applied by blower unit 700 within blower screen portion 250.

As described, the relative length of respective screen portions 230, 240, and 250, is about 1 to 8.5 to 1.5. That is, vacuum screen portion 230 extends for about 9% of the full length of screen 200; wash screen portion 240 extends for about 77% of the full length of screen 200; and blower screen portion 250 extends for about 14% of the full length of screen 200. These specifications have been observed to be highly desirable for processing of drill cuttings and drilling mud using apparatus 10 and system 1. However, some variation may be made to these dimensions without substantially affecting performance.

The use of shaftless screw conveyers 300 of apparatus 10, in fixed connection within cylindrical screens 200, has been observed to be advantageous for forcing drill cuttings from inlet end 210 to outlet end 220 of screen 200 at a controlled rate, upon rotation of screen 200 relative to screw conveyer 300. However, shafted and/or rotating screw conveyers may alternatively be used, with suitable modifications. Furthermore, although not typical, in some circumstances it may be possible to exclude screw conveyer 300. For example, an incline of screen 200 could be relied upon for transfer of particles from inlet end 210 to outlet end 220 of screen 200.

The inclusion of vacuum unit 400 in apparatus 10 may be of minor importance during normal operation, at least under some circumstances. Accordingly, in certain alternative embodiments, vacuum unit 400 is excluded from apparatus 10. However, vacuum unit 400 is typically included, as the unit is advantageous to assist with process of excess drilling mud, for example when drilling trips or some other malfunction affecting input occurs, such as breakage of a shaker screen within pre-treatment unit 5.

As described, suction head 410 of vacuum unit 400 is arranged to apply suction to approximately 40% of the perimeter of outer surface 270 of screen 200, along about 1 in 11, or about 9%, of the length of screen 200, within vacuum screen portion 230. Applying suction to such a portion of outer surface 270 of the screen has been observed to be advantageous for processing of drill cuttings combined with drilling mud. It will be appreciated, however, that some variation to these parameters may be made. Typically, suction head 410 will be arranged to apply suction to between about 20% and about 60%, including about 30%, 40%, and 50%, of the perimeter of outer surface 270 of screen 200. Typically, suction head 410 will be arranged to apply suction to between about 5% to about 20%, including about 10% and 15%, of the length of screen 200 from inlet 210.

As set out above, suction head 410 of vacuum unit 400 is arranged to apply suction at a position slightly offset about a lowest point of outer surface 270 of screen 200, in the direction of screen rotation. This arrangement has been found to be advantageous as the bulk of drilling mud combined with drill cuttings tend to be located slightly towards the direction of screen rotation within screen 200. Typically, suction head 410 will be arranged to apply suction at a position offset about the lowest point of outer surface 270 of screen 200 by between about 2% and about 10%, including 3, 4, 5, 6, 7, 8, and 9%. In some alternative embodiments, vacuum unit 400 may comprise an actuator, allowing for adjustment of the position of suction head 410 relative to outer surface 270.

The use of dual venturi operated vacuum pumps for vacuum unit 400 comprising can be advantageous, as such an arrangement can be used out-of-phase to produce approximately constant vacuum through respective suction heads 410. However, one vacuum pump may alternatively be used for vacuum unit 400.

The inclusion of wash unit 500 of apparatus 10 comprising respective pluralities of spray openings evenly spaced within wash screen portion 230, has been found to be advantageous for assisting with removal of drilling mud from drill cuttings. The arrangement of eleven manifolds 511, each manifold 511 comprising four spray openings 512, adapted to deliver substantially fan-shaped pressure spray at each position within cylindrical screen 200 has been observed to produce highly desirable results for removing drilling mud from drill cuttings. Additionally, the inclusion of a single spray opening after each manifold 511 along feeder pipe 510 is considered advantageous. However, it will be appreciated that the number of manifolds 511, and/or the number of spray openings 512 may be varied. Typically, wash unit 500 comprises at least three manifolds 511, including 4, 5, 6, 7, 8, 9, 10, 11, 12, 13, 14, and 15 manifolds 511. Typically, each spray pipe 511 comprises at least three spray openings, including 4, 5, 6, 7, 8, 9, and 10 spray openings. In some alternative embodiments, feeder spray openings may be excluded from feeder pipe 510.

The ability of control the pressure of the pressure spray from spray openings 512, using variable frequency drive 3000, has been observed to be highly advantageous. Where pressure is too low, this can decrease the efficacy of the spray wash for removing drilling mud from drill cuttings. Where pressure is too high, this can result in excessive breakage of drill cuttings, typically by forcing of drill cuttings against one another, resulting in excessive particulate fines. A range of pressure of about 45 psi to about 70 psi, including about 50, 55, 60, and 65 psi, has been observed to generally produce desirable results. However, some variation to this pressure range may be appropriate in certain circumstances.

The arrangement of manifolds 511 curved substantially coaxially within cylindrical screen 200, slightly offset about a lowest point of cylindrical screen 500 in the direction of screen rotation, has been observed to produce highly desirable results for removing drilling mud from drill cuttings. It will be appreciated that this arrangement focuses the fan-shaped pressure spray from openings 512 on the position of the bulk of drill cuttings within screen 200.

The inclusion of actuator 520 of wash unit 500 can be advantageous, as this allows for the degree of offset of the fan-shaped spray to be adjusted, for example to cater for variation in the position of the bulk of drill cuttings that may occur, for example, with different materials and/or different rotation speeds of rotatable unit 2000. Typically, however, manifolds 511 will be offset about the lowest point of the outer surface of screen 200 by between about 2% and about 10%, including 3, 4, 5, 6, 7, 8, and 9%. Although not typical, in some alternative embodiments, actuator 520 may be excluded, and the focus of the spray fixed, typically somewhere within the preceding range of offset about the lowest point of screen 200.

Typically, feeder pipes 510 of wash unit 500 are 0.75 inch pipes. Typically, spray pipes 511 are 0.5 inch pipes. Typically, spray openings 512 are 0.25 inch openings. The preceding dimensions have been observed to be desirable for pressure maintenance and efficient wash agent delivery using wash unit 500, however some variation may be made without substantially affecting performance.

Desirable results have been achieved using a range of surfactants for delivery by wash unit 500. Characteristics that may be desirable for surfactants, at least in the context of separation of drill cuttings from OBM, can include (without limitation): non-ionic or ionic; substantially non-emulsifying with water; substantially biodegradable; substantially non-flammable; substantially soluble in water; substantially non-toxic; gold rated under the Centre for Environment, Fisheries and Aquaculture Science (CEFAS) Offshore Chemical Notification Scheme (OCNS).

The arrangement of catch tank 600 comprising tank wall 610 inclined towards catch tank floor 620, and catch tank pump 630 located at catch tank floor 620, has been observed to be highly advantageous for effective transfer of the mixture comprising the flowable substance, the wash agent, and particulate fines, from catch tank 600 in a continuous manner. As described, the degree of incline of catch tank wall 610 towards catch tank floor 620 is typically at least 60°, such as at least 65°. Additionally, the use of a submersible impeller pump 630 positioned on catch tank floor 620 has been observed to be highly desirable for effective transfer from catch tank 600.

The inclusion of blower unit 700 is considered advantageous for transferring residual flowable substance, wash agent, and/or particulate fines to catch tank 620. It is considered desirable for blower outlet 710, in the form of an air knife, to blower air substantially along the full length of vacuum portion 250. Placement of blower outlet 710 in the form of air knife about 150 mm from screen 200 is also considered desirable. However, some variation to the placement of blower outlet 710 may be made. Furthermore, while blower unit 700 can improve overall processing efficiency, in alternative embodiments blower 700 may be excluded.

The typical arrangement of supply unit 20 within system 1 as described herein, wherein supply tank 201 receives water doses with surfactant under regulation by float valve 2021, has been observed to be beneficial for maintaining a supply of wash agent for delivery to wash unit 500 of apparatus 10. In particular, the delivery of dosed water into delivery tank 201 through an outlet below the surface of the aqueous surfactant has been observed to be beneficial to avoid unwanted frothing of the aqueous surfactant. The use of submerged supply tank pump 2011 for delivery of the aqueous surfactant to the wash unit 500 has also been observed to be beneficial to avoid unwanted frothing.

The inclusion of centrifuge unit 25 within system 1 has important advantages. In particular, centrifuge unit 25 allows for further processing of the solution or mixture passed through screen 200, comprising the drilling mud in combination with the aqueous surfactant and particulate fines. Advantageously, centrifuge unit 25 achieves separation of particulate fines, in the solid phase; separation of drilling mud, in the oil phase; and separation of aqueous surfactant, in the water phase.

The use of a suitable three-phase decanting centrifuge 251, such as a Tricanter centrifuge, within centrifuge unit 25 is particularly advantageous, as such centrifuges typically provide desirable performance when separating solids from one or more liquid or flowable phases, in a continuous process. Typically, such centrifuges are designed to handle a wide range of particles with diameters from 5 mm to a few microns.

The separation of oil phase and water phases using three-phase decanting centrifuge 251 has been observed to offer particular advantages.

In regard to the oil phase, the use of a suitable three-phase decanting centrifuge 251 allows for drilling mud to be recovered at a very high level of purity. As the skilled person will appreciated drilling mud becomes converted from 'unweighted' mud, which is substantially pure, to 'weighted' mud, including unwanted particulate impurities, during the process of drilling. Drilling mud recovered in the oil phase using three-phase decanting centrifuge 251 is substantially pure, or substantially unweighted, and highly desirable for re-use.

In regard to the water phase, the wash agent applied to the drill cuttings using wash unit 500 is recovered in this phase, and can be recycled into supply unit 20. Over a period of several cycles using system 1, the concentration and/or activity of surfactant has been observed to decrease in the recovered water phase. However, this has been observed to be offset by continued dosing of new wash agent with approximately surfactant, typically about 1% to about 3% surfactant, such as about 2% surfactant.

Advantageously, as herein described, various parameters that have been observed to be important to achieve desirable results using apparatus 10 and system 2 can be adjusted using variable frequency drive 3000. It will be appreciated that, advantageously, adjustments to such parameters may be performed in a coordinated manner using variable frequency drive 3000.

By way of elaboration, as herein described, delivery of drill cuttings combined with drilling mud using inlet control 50 can be adjusted by adjusting rotation of inlet control screw conveyer 51 using variable frequency drive 3000. Rotation of rotatable units 2000 can also be controlled using variable frequency drive 3000. The pressure of delivery of aqueous surfactant by wash unit 500 can also be controlled using variable frequency drive. Furthermore, in some typical embodiments, one or more other motors, actuators, and/or pumps of apparatus 10 and system 2, can be controlled using variable frequency drive 3000. By way of non-limiting example, in some typical embodiments, the vacuum pumps of vacuum unit 400; catch tank pump 630 of catch tank 600; blower outlet 710 of blower unit 700; and/or one or more components of centrifuge unit 25, including centrifuge 251, reclaim tank pump 2521, oil transfer pump 2531, and/or centrifuge unit screw conveyer 254, may be controllable by variable frequency drive 3000. The skilled person will appreciate that coordinated adjustment of various parameters of apparatus 10 and system 2 using variable frequency drive 3000 can be highly advantageous for optimising efficacy when processing samples with varying properties within or between applications, such as when processing drill cuttings combined with drilling mud within and between runs.

Advantageously, apparatus 10 and system 1, or components thereof, can be produced and/or arranged in modular form. This can be of substantial benefit, particularly when apparatus 10 and system 1 are used in a space-limited scenario, such as on an offshore drilling rig. More particularly, it has been found that system 1 can be arranged within the footprint of a standard 20-foot shipping container. To achieve this apparatus 10, and supply unit 20, and centrifuge unit 25, are located within a frame, with apparatus 10 and supply unit 20 typically located above centrifuge unit 25. More particularly, apparatus 10 and supply unit may be located within a first frame assembly 2, mounted on top of a second frame assembly 3, of substantially the same size and shape. Typically, first frame assembly 2 is slidable mounted on top of second frame assembly 3, such as on tracks and rollers. Such a slidable mounting arrangement advantageously allows efficient access to centrifuge 251 of centrifuge unit 25, such as for opening a hood of centrifuge 251.

In this specification, terms such as "above" and "below"; "front" and "back"; "top" and "bottom"; "left" and "right"; "horizontal" and "vertical", and the like, may be used herein for descriptive purposes. However, it will be understood that embodiments of the apparatus and system can potentially be arranged in various orientations, and that such relative terms are not limiting and may be interchangeable in appropriate circumstances.

In this specification, unless the context requires otherwise, the terms "connection", "connected", "connecting", and the like, are not to be read as limited to direct connections, and may also include indirect connections. For example, unless the context requires otherwise, a stated first component "connected" to a stated second component may be connected via, through, or by, one or more unstated components.

It will be appreciated that the indefinite articles "a" and "an" are not to be read as singular indefinite articles or as otherwise excluding more than one or more than a single subject to which the indefinite article refers. For example, "a" screen includes one screen, one or more screens or a plurality of screens.

In this specification, the terms "comprises", "comprising", "includes", "including", and similar terms are intended to mean a non-exclusive inclusion, such that an apparatus, system, or method that comprises a list of elements does not include those elements solely, but may well include other elements not listed.

The above description of embodiments of the invention is provided for purposes of description to one of ordinary skill in the related art. It is not intended to be exhaustive or to limit the invention to a single disclosed embodiment. In some instances, well-known components and/or processes have not been described in detail, so as not to obscure the embodiments described herein.

As described, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

The invention claimed is:

1. An apparatus for separating particles from a flowable substance, the apparatus comprising:
   an inlet for entry of particles combined with the flowable substance;
   an outlet for exit of particles separated from the flowable substance;
   an elongated rotatable screen comprising an inner surface and an outer surface, located between the inlet and the outlet;
   a wash unit for delivering a wash agent to the particles under controlled pressure through a plurality of spray openings adapted to spray the wash agent as a fan-like spray;
   a vacuum unit configured to obtain at least a portion of the flowable substance through the screen under vacuum at a position towards the inlet of the apparatus prior to delivery of wash agent to the particles by the wash unit, wherein:
   the screen allows for passage of the flowable substance through the inner surface thereof past the outer surface thereof, and the inner surface of the screen defines a path for passage of the particles between the inlet and the outlet; and
   delivery of the wash agent to the particles assists with separation of the particles from the flowable substance.

2. The apparatus of claim 1, wherein the screen is enclosed except at an open inlet end and an open outlet end.

3. The apparatus of claim 1, wherein the screen is cylindrical.

4. The apparatus of claim 1, wherein the screen is in a horizontal orientation between the inlet and outlet.

5. The apparatus of claim 1, wherein the screen is located within a housing of the apparatus.

6. The apparatus of claim 1, wherein the wash unit is adapted to supply the wash agent to the particles at a plurality of spaced positions within the screen at decreasing distances from the outlet.

7. The apparatus of claim 1, comprising a rotatable conveyer located adjacent to the inner surface of the screen, wherein rotation of the conveyor is adapted to move the particles towards the outlet.

8. The apparatus of claim 7, wherein the screen is in fixed connection with the conveyer, and the screen and the conveyer rotate as a unit.

9. The apparatus of claim 1, comprising a vacuum unit for obtaining at least a portion of the flowable substance through the screen under vacuum.

10. The apparatus of claim 1, wherein the vacuum unit comprises a suction head in sprung connection with the screen, wherein the suction head is offset about a lowest point of the screen in the direction of screen rotation.

11. The apparatus of claim 1, comprising a catch tank adapted to receive a mixture of the flowable substance, the wash agent, and particulate fines, through the screen, wherein the catch tank comprises a wall having an incline of at least 60% to direct the mixture received through the screen towards a floor of the tank.

12. The apparatus of claim 1, comprising a blower unit adapted to transfer residual flowable substance, wash agent, and/or particulate fines, through the screen by air flow at a position towards the outlet of the apparatus.

13. The apparatus of claim 1, comprising an inlet control conveyer for delivery of the particles combined with the flowable substance through the inlet of the apparatus.

14. A system for separating particles from a flowable substance, the system comprising the apparatus of claim 1;
   a supply unit for supplying wash agent to the wash unit of the apparatus; and
   a centrifuge unit for separating phases of a solution or mixture comprising at least a portion of the flowable substance that has passed through the screen of the apparatus.

15. The system of claim 14, wherein the centrifuge unit comprises a three-phase decanting centrifuge adapted to separate a mixture obtained from the apparatus comprising the flowable substance, the wash agent, and particulate fines into: a solid phase; an oil phase; and a water phase.

16. The system of claim 14, comprising a tank for receiving a water phase separated by the centrifuge, wherein the tank is of or connected to the supply unit and the water phase is recycled into the wash agent.

17. A system for separating drill cuttings from drilling mud comprising:
   a rotatable cylindrical screen comprising an inlet adapted to receive drill cuttings combined with drilling mud and an outlet longitudinally spaced from the inlet; and a screw conveyer in fixed connection with the screen and extending within the screen between the inlet and the outlet, wherein rotation of the cylindrical screen and the screw conveyer is adapted to move the drill cuttings along an inner surface of the screen towards the outlet for exit through the outlet;
   a wash unit comprising a plurality of manifolds positionable within the cylindrical screen away from the inlet at spaced locations extending towards the outlet, each manifold comprising a plurality of spray openings supplied by a pressurized aqueous surfactant supply tank, the spray openings being adapted to apply a fan-like spray of the aqueous surfactant to the drill cuttings within the cylindrical screen;
   a vacuum unit comprising a suction head in sprung connection with a portion of an outer surface of the screen at or towards the inlet, the vacuum unit adapted to obtain drilling mud under vacuum through the screen prior to delivery of aqueous surfactant to the drill cuttings by the wash unit and to transfer the drilling mud from the system for re-use;
   a catch tank adapted to receive a mixture comprising drilling mud combined with aqueous surfactant and particulate fines that has passed through the cylindrical screen; and
   a centrifuge unit adapted to receive the mixture comprising drilling mud, aqueous surfactant, and particulate fines received by the catch tank, to separate the drilling mud, aqueous surfactant, and particulate fines into solid, oil, and water phases, and to recycle the water phase separated by the centrifuge unit into the aqueous surfactant supply tank.

18. A method of separating particles from a flowable substance, including steps of:
   placing particles combined with a flowable substance on a rotating screen comprising an inner surface and an outer surface;
   moving the particles along the inner surface of the screen;
   passing at least a first portion of the flowable substance through the inner surface to the outer surface of the screen;
   adding a wash agent to the particles under controlled pressure as a fan-like spray, wherein the spraying under pressure as a fan-like spray assists with separation of the particles from the flowable substance; and
   obtaining particles separated from the flowable substance from the screen, to thereby separate the particles from the flowable substance, wherein the first portion of the flowable substance is passed through the inner surface to the outer surface of the screen under vacuum prior to delivery of the wash agent to the particles.

19. The method of claim 18, wherein the flowable substance is drilling oil or drilling mud, and the particles separated from the flowable substance are drill cuttings.

\* \* \* \* \*